(12) United States Patent
Grossmann et al.

(10) Patent No.: US 10,434,876 B2
(45) Date of Patent: Oct. 8, 2019

(54) ACTIVE ACCELERATOR PEDAL

(71) Applicant: Robert Bosch GmbH, Stuttgart (DE)

(72) Inventors: Alex Grossmann, Leonberg (DE); Udo Sieber, Bletigheim (DE); Daniel Henning, Sersheim (DE); Thomas Klotzbuecher, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 426 days.

(21) Appl. No.: 14/427,830

(22) PCT Filed: Sep. 17, 2013

(86) PCT No.: PCT/EP2013/069264
§ 371 (c)(1),
(2) Date: Mar. 12, 2015

(87) PCT Pub. No.: WO2014/056684
PCT Pub. Date: Apr. 17, 2014

(65) Prior Publication Data
US 2015/0239346 A1 Aug. 27, 2015

(30) Foreign Application Priority Data
Oct. 8, 2012 (DE) .......... 10 2012 218 283

(51) Int. Cl.
B60K 26/00 (2006.01)
B60K 26/02 (2006.01)
G05G 1/38 (2008.04)

(52) U.S. Cl.
CPC ............ B60K 26/021 (2013.01); G05G 1/38 (2013.01); B60K 2026/022 (2013.01)

(58) Field of Classification Search
CPC ............... F02D 41/266; F02D 13/0253; F02D 41/0082; Y02T 10/18; B64C 13/04;
(Continued)

(56) References Cited

U.S. PATENT DOCUMENTS 5,673,668 A * 10/1997 Pallett .................. F02D 11/107
                                                              123/349
5,714,702 A *  2/1998 Ishii ........................ G10G 3/04
                                                                84/13
(Continued)

FOREIGN PATENT DOCUMENTS

CN      101204929 A     6/2008
CN      102089174 A     6/2011
(Continued)

OTHER PUBLICATIONS

International Search Report corresponding to PCT Application No. PCT/EP2013/069264, dated Jan. 22, 2014 (German and English language document) (5 pages).

Primary Examiner — James M McPherson
(74) Attorney, Agent, or Firm — Maginot, Moore & Beck LLP

(57) ABSTRACT

An active accelerator pedal for a vehicle includes a pedal position sensor configured to detect a position of a pedal lever of the active accelerator pedal and to convert the position into a pedal position signal. The active accelerator pedal further includes an actuator configured to output haptic feedback to the pedal lever. The active accelerator pedal further includes an actuator controller configured to control the actuator. The pedal position sensor is configured to transmit pedal position signals to a central engine controller of the vehicle the engine controller is configured to control drive of the vehicle using the central engine controller, and the actuator controller is configured to receive a pedal position signal from the pedal position sensor.

11 Claims, 3 Drawing Sheets

(58) Field of Classification Search
CPC ......... B64C 13/10; B64C 13/12; B64C 13/46;
B64C 13/503; B60K 26/021; B60T
2220/04; B60T 7/042; B60T 8/173;
B60W 10/06; B60W 10/184; B60W
2050/0005; B60W 2050/0006; B60W
2050/009; B60W 2050/0093; B60W
2050/065; B60W 2720/28
USPC ...... 701/36, 70, 102, 103, 58, 110; 702/184;
700/63, 275; 60/602; 123/90.15, 179.3,
123/349, 481, 399; 84/13; 370/400;
180/170; 310/12.04; 307/10.1;
324/207.2, 522; 341/182
See application file for complete search history.

(56) References Cited

U.S. PATENT DOCUMENTS

| | | | | |
|---|---|---|---|---|
| 7,319,927 B1* | 1/2008 | Sun | ...................... | B60W 10/06 |
| | | | | 180/170 |
| 2002/0103623 A1* | 8/2002 | Hasegawa | .............. | G07C 5/008 |
| | | | | 702/184 |
| 2002/0120385 A1* | 8/2002 | Mehta | ................... | F02D 11/105 |
| | | | | 701/110 |
| 2003/0041829 A1* | 3/2003 | Marshall | ............... | F01L 13/065 |
| | | | | 123/179.3 |
| 2003/0190996 A1 | 10/2003 | Yone | | |
| 2004/0263180 A1* | 12/2004 | Rogers | .................... | F16H 61/12 |
| | | | | 324/522 |
| 2005/0057098 A1* | 3/2005 | Bouchon | ................. | B60K 6/28 |
| | | | | 307/10.1 |
| 2005/0077893 A1* | 4/2005 | Keefover | .............. | F02D 11/107 |
| | | | | 324/207.2 |
| 2005/0080495 A1* | 4/2005 | Tessier | ................... | B64C 13/04 |
| | | | | 700/63 |
| 2006/0227793 A1* | 10/2006 | Fehr | .................... | F02D 41/2409 |
| | | | | 370/400 |
| 2007/0186884 A1* | 8/2007 | Grider | ................. | F02D 13/0253 |
| | | | | 123/90.15 |
| 2008/0000454 A1* | 1/2008 | Grider | ................. | F02D 13/0253 |
| | | | | 123/481 |
| 2008/0158039 A1* | 7/2008 | Kassner | ............... | G01D 5/2457 |
| | | | | 341/182 |
| 2008/0283005 A1* | 11/2008 | Kawada | ................ | F02N 11/006 |
| | | | | 123/90.15 |
| 2008/0283024 A1* | 11/2008 | Gregorio | .............. | F02D 11/105 |
| | | | | 123/399 |
| 2010/0179740 A1* | 7/2010 | Lubbers | .................. | B60T 7/042 |
| | | | | 701/70 |
| 2010/0211276 A1* | 8/2010 | Tokura | .................. | F16H 61/061 |
| | | | | 701/58 |
| 2011/0260557 A1* | 10/2011 | Noh | ...................... | B60K 26/021 |
| | | | | 310/12.04 |
| 2012/0053735 A1* | 3/2012 | Tessier | .................... | B64C 13/04 |
| | | | | 700/275 |
| 2012/0143441 A1 | 6/2012 | Yamazaki et al. | | |
| 2012/0239270 A1* | 9/2012 | Ikeda | .................. | F02D 41/1479 |
| | | | | 701/102 |
| 2012/0239275 A1* | 9/2012 | Hoshi | ................. | F02D 41/1497 |
| | | | | 701/103 |
| 2012/0303216 A1* | 11/2012 | Yoshimura | ................ | G06F 9/52 |
| | | | | 701/36 |
| 2013/0098033 A1* | 4/2013 | Murakami | ............. | F02B 37/18 |
| | | | | 60/602 |

FOREIGN PATENT DOCUMENTS

| | | |
|---|---|---|
| EP | 2 492 130 A2 | 8/2012 |
| JP | 2007-22238 A | 2/2007 |
| JP | 2012-116355 A | 6/2012 |
| JP | 2012-171526 A | 9/2012 |
| WO | 2012/029503 A1 | 3/2012 |

* cited by examiner

ACTIVE ACCELERATOR PEDAL

This application is a 35 U.S.C. § 371 National Stage Application of PCT/EP2013/069264, filed on Sep. 17, 2013, which claims the benefit of priority to Serial No. DE 10 2012 218 283.7, filed on Oct. 8, 2012 in Germany, the disclosures of which are incorporated herein by reference in their entirety.

The disclosure relates to an active accelerator pedal for a vehicle, a control system for an active accelerator pedal and a vehicle.

BACKGROUND

An active gas pedal or accelerator pedal can give the driver different feedback by means of haptic signals. The active accelerator pedal is fitted with a suitable actuator for this purpose. The control of the actuator is carried out by a local actuator controller in the form of electronics that can also be integrated within the accelerator pedal and that can be triggered by means of signals via a CAN bus for example.

For safety reasons the actuator can be mechanically coupled to the accelerator pedal so that only forces in the pedal return direction can be transferred from the actuator to the accelerator pedal. Mechanical solutions with which the pedal can move when decoupled from the actuator also require the pedal position in addition to the actuator position for position regulation of the actuator.

The pedal angle, i.e. an actual position of an accelerator pedal lever, can be detected with two redundant sensor elements and transmitted to the ECU, i.e. to a central engine controller. In general, very high accuracy requirements, for example regarding the measurement value, the synchronization and the relationship of the two signals relative to each other, are placed on the two redundant signals of the two sensor elements during this for analysis and diagnostic purposes.

Therefore it is a disadvantage to "tap" at least one of the signal lines leading to the central engine controller, each of which is connected to a sensor element, to transmit the signal to the actuator controller and to analyze it there, because the actuator controller generally operates with a different voltage supply and with a different ground connection and signal offsets can occur, for example because of a ground offset, and hence synchronization requirements are no longer fulfilled.

Therefore, a second pedal position sensor is normally used for the actuator, which provides the signals for the actuator controller in order to avoid the above mentioned disadvantages.

SUMMARY

It is the object of the disclosure to provide a safe and simply designed active accelerator pedal.

This object is achieved by the subject matter of the independent claims.

Further embodiments of the disclosure are revealed in the dependent claims and in the following description.

One aspect of the disclosure relates to an active accelerator pedal for a vehicle, for example an automobile, truck or bus.

According to one embodiment of the disclosure, the active accelerator pedal comprises a pedal position sensor that is designed to detect a position of a pedal lever of the active accelerator pedal and to convert the same into a pedal position signal, an actuator that is designed to output haptic feedback to the pedal lever and an actuator controller that is designed to control the actuator. The pedal position signal can for example be a voltage signal, whose magnitude is related to the pedal position or the pedal angle. Haptic feedback can be an additional force that is produced by the actuator and that opposes the force of the driver. Haptic feedback can also be a vibration or a displacement of the pedal lever.

The pedal position sensor is designed to transmit signals to a central engine controller of the vehicle, with which the engine controller controls the drive of the vehicle. For example, the pedal position sensor can be connected to the central engine controller by means of analog lines. Furthermore, the actuator controller is designed to receive a pedal position signal directly or indirectly from the pedal position sensor and especially to further process the signal.

The active accelerator pedal can thus only comprise one pedal position sensor (which, however, can comprise a plurality of redundant sensor elements), which is connected to the central engine controller and which also provides pedal position signals for the actuator controller. The detection of the pedal position for the position regulation of the actuator in the pedal control electronics or the actuator controller thus requires no additional sensor and ensures the absence of a reaction to the redundant pedal sensor signals for the central engine controller. This results in installation space, wiring and cost advantages.

The actuator controller can be a local actuator controller. That is, it can be located in the same housing, on the same circuit board and/or in the same assembly as the pedal position sensor and/or the other components of the active accelerator pedal.

According to one embodiment of the disclosure, the actuator controller is connected to the pedal position sensor by means of a direct signal connection. A direct signal connection can take place by means of the lines of the same assembly or of the circuit board on which the sensor and the actuator controller are disposed. The pedal position sensor can thus be designed to provide first pedal position signals for the central engine controller by means of a first line and second pedal position signals for the actuator controller by means of a second line.

According to one embodiment of the disclosure, the actuator controller is connected to the pedal position sensor by means of a signal connection that is designed to transfer pulse width modulated signals. The pedal position sensor can be designed to produce pulse width modulated signals. In the case of a pulse width modulated signal, the absolute voltage level of the signal is not analyzed, but the duty cycle. Tolerances in the voltage level of a pulse width modulated signal can be less critical and thus negligible.

According to one embodiment of the disclosure, the actuator controller is connected to the pedal position sensor by means of an SPI (Serial Peripheral Interface) connection. Alternatively, the transmission of the pedal position signal can take place via an SPI bus. The pedal position sensor can be designed to produce SPI signals.

All in all, the detected pedal position can thus be transmitted to the actuator controller by means of a PWM channel or SPI channel disposed in the sensor chip without effects on the (possibly redundant) pedal position signals for the central engine controller occurring during this (for example as a result of a ground offset).

According to one embodiment of the disclosure, the pedal position sensor comprises two sensor elements, wherein both sensor elements are connected to the central engine controller. Both sensor elements can be disposed on a common circuit board or a common chip and/or can provide redundant pedal position signals to the central engine controller. Only one of the two sensor elements can be connected to the actuator controller and/or can provide the pedal position signals for the actuator controller.

Another aspect of the disclosure relates to a control system for an active accelerator pedal, as described above and below. The control system comprises a central engine controller and a local actuator controller for the actuator of the active accelerator pedal. The central engine controller is designed to receive a pedal position signal from the pedal position sensor, for example by means of a direct connection, for example by means of a line under voltage, whose voltage level reproduces the pedal position or the pedal angle. The engine controller can convert an analog pedal position signal into a digital pedal position signal and can process the digital signal.

According to one embodiment of the disclosure, the central engine controller is designed to process the pedal position signal and to transmit it by means of a bus connection to the actuator controller (for example in digital form). The bus can be a CAN bus in this case, to which the central engine controller and the actuator controller are connected.

The actuator controller can receive the pedal position signal from the pedal position sensor indirectly from the central engine controller, wherein the signal can be processed by the central engine controller. A direct (physical connection) between the pedal position sensor and the actuator controller is not necessary. This enables the actuator controller and the pedal position sensor to be completely electrically decoupled. The pedal position signal can thus be transmitted to the actuator controller by means of a bus system.

According to one embodiment of the disclosure, the central engine controller is designed to form a time derivative of the pedal position signal and/or to cap the pedal position signal and transmit it to the actuator controller. In general, functions can be moved from the actuator controller into the central engine controller.

According to one embodiment of the disclosure, the central engine controller is designed to combine a series of pedal position signals from the pedal position sensor to form a filtered pedal position signal and to transmit the filtered pedal position signal to the actuator controller.

Another aspect of the disclosure relates to a vehicle with an active accelerator pedal and to a control system, as described above and below.

BRIEF DESCRIPTION OF THE DRAWINGS

Exemplary embodiments of the disclosure are described in detail below with reference to the accompanying figures.

In principle, identical or similar parts are provided with the same reference characters.

DETAILED DESCRIPTION

Figure 1:
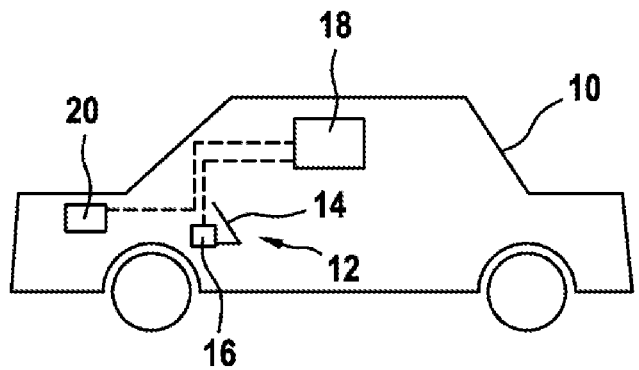
FIG. 1 shows schematically a vehicle with an active accelerator pedal according to an embodiment of the disclosure.

FIG. 1 shows a vehicle 10 with an active accelerator pedal 12 that comprises a pedal lever 14 that can be operated by the driver by foot and an actuator 16, for example with a motor. A central engine controller 18 receives sensor signals concerning the pedal position of the pedal lever 14 of the active accelerator pedal and controls a drive 20, for example an internal combustion engine or an electric motor, of the vehicle 10 appropriately.

Figure 2:
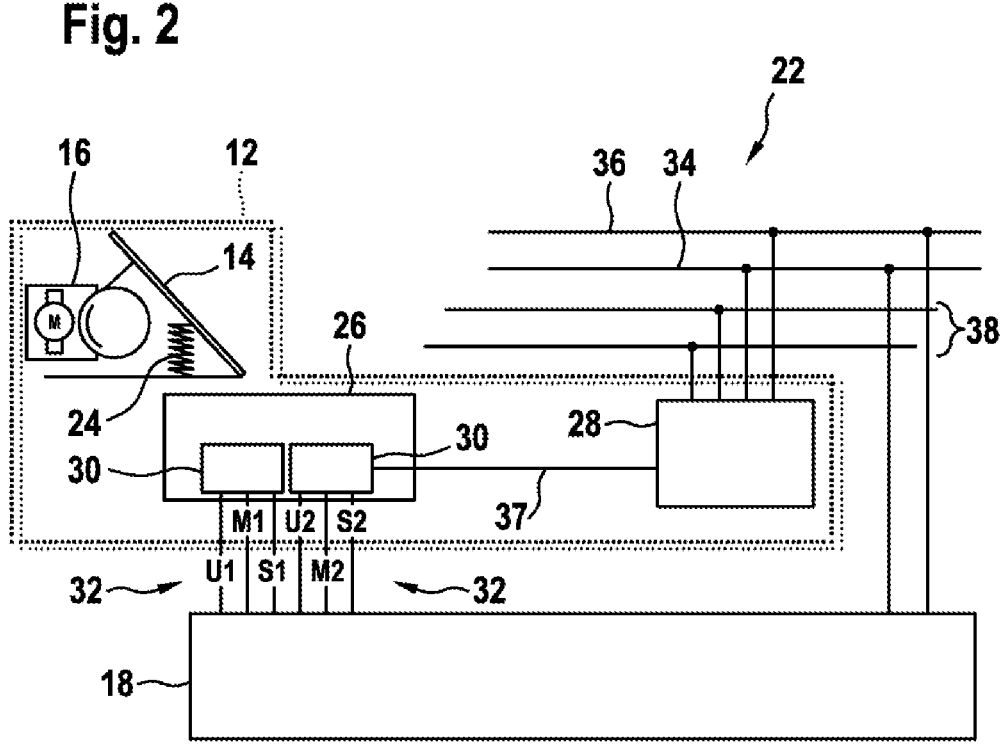
FIG. 2 shows schematically a control system for an active accelerator pedal according to an embodiment of the disclosure.

FIG. 2 shows a control system 22 for the active accelerator pedal 12 in detail. The active accelerator pedal 12 comprises mechanical components in this case, such as the pedal lever 14, a return spring 24 for the pedal lever 14 and the actuator 16, which are installed in a common assembly or a pedal module together with electronic components, such as a pedal position sensor 26 and an actuator controller 28.

The pedal position sensor 26 comprises two redundant sensor elements 30, for example on a common pedal sensor circuit board or a common chip. The two sensor elements 30 are each connected to the central engine controller 18 by means of analog connections 32. Here each of the lines comprises a line U1, U2 to the voltage supply, a ground line M1, M2 and a line S1, S2 for the pedal position signals. The pedal position of the pedal lever 16 is linearly detected by means of the two redundant pedal angle sensors 30. The two pedal angle sensors 30 are supplied with voltage from the central engine controller 18 and feed the pedal angle back to the central engine controller.

One of the two sensor elements 30 is designed to produce a pulse width modulated pedal position signal and to output the signal to an additional output. Said pedal position signal is transmitted by means of a local line 37 of the active accelerator pedal 12 to the actuator controller and is processed there.

As well as the central engine controller 18, the actuator controller 28 is connected to a ground line 34 and a battery voltage line 36. With one of the two pedal angle sensors 30 that are provided, a pulse width modulated output channel is provided and is used to transmit the pedal angle to the pedal control electronics 28 of the active part of the active accelerator pedal 12.

Furthermore, the actuator controller 28 can be connected to a CAN bus 38.

Figure 3:
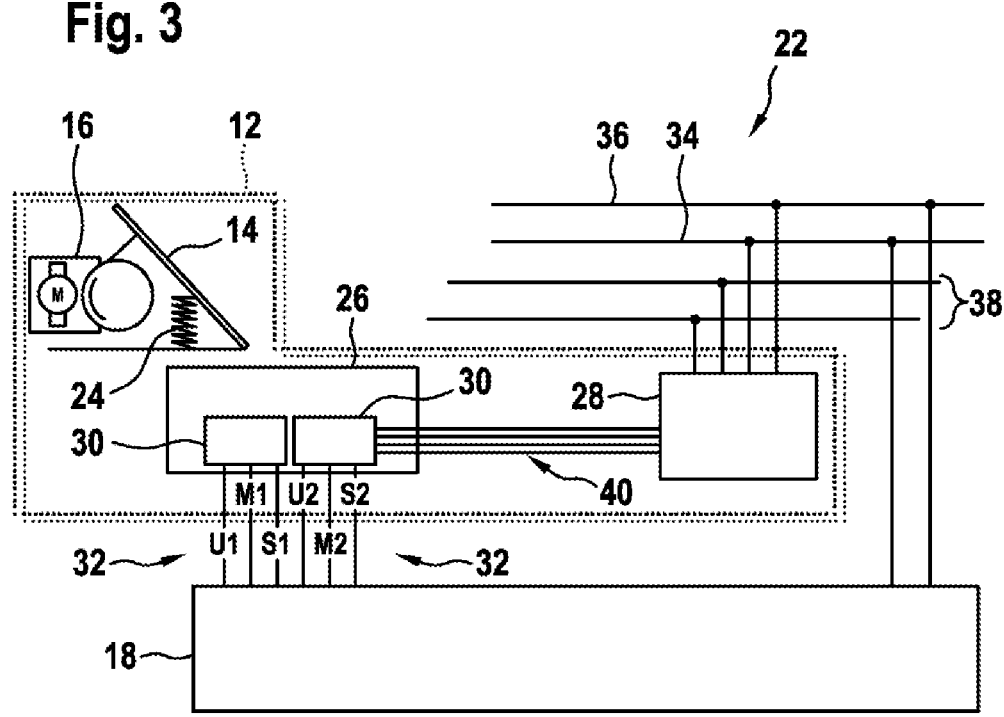
FIG. 3 shows schematically a control system for an active accelerator pedal according to a further embodiment of the disclosure.

FIG. 3 shows schematically a further embodiment for a control system 22. In FIG. 3 one of the two redundant sensor elements 30 is designed to produce an SPI signal. The actuator controller 28 is connected to one of the sensor elements 30 by means of a local SPI connection 40 (with four lines). The transmission of the pedal angle to the pedal control electronics 28 of the active part of the active accelerator pedal 12 can take place by means of an SPI bus 40.

Figure 4:
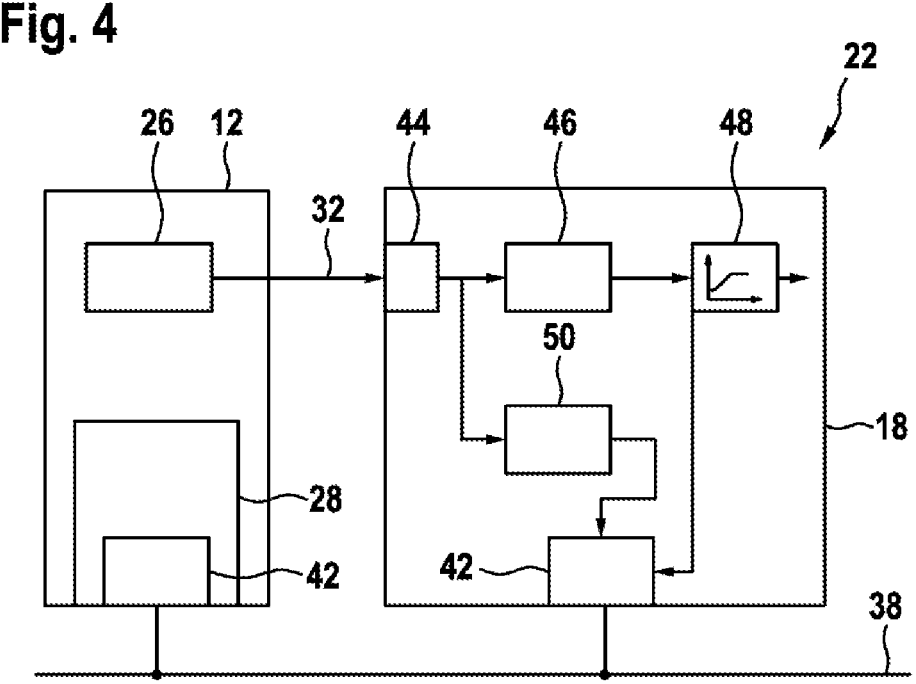
FIG. 4 shows schematically a control system for an active accelerator pedal according to a further embodiment of the disclosure.

FIG. 4 shows a further embodiment of a control system 22 for an active accelerator pedal 12. With this embodiment there is no direct (electrical) connection between the pedal position sensor 26 and the actuator controller 28.

Both the actuator controller 28 and the central engine controller 18 comprise a CAN node 42, with which they are each connected to the CAN bus 38.

The analog pedal position signal from the connection 32 is converted in an A/D converter 44 of the central engine controller 18 into a digital signal, is filtered in a filter 46 and is capped in a capping element 48. For example, the pedal position can be linearly detected by means of the sensor elements 30 and the capping of the signal is omitted at the stops of the pedal lever 14 and takes place in the central engine controller 18 instead.

Figure 5:
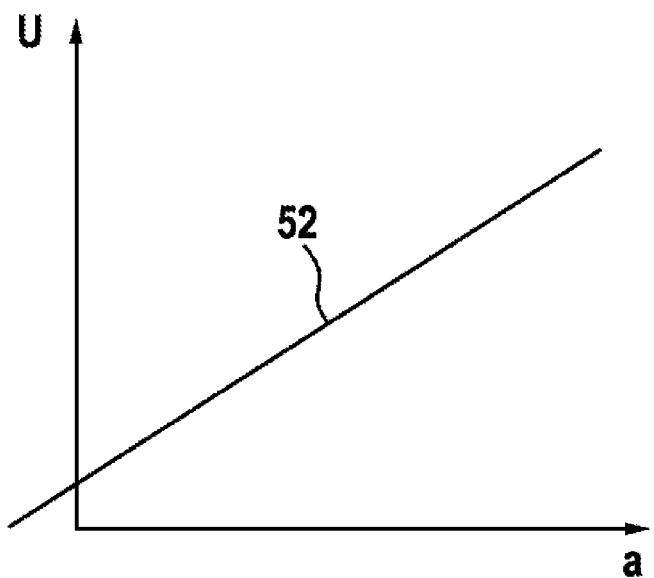
FIG. 5 shows a pedal position signal according to an embodiment of the disclosure.

FIG. 5 shows a pedal position signal, such as can be produced by the pedal position sensor 26. In the diagram of FIG. 5, the pedal angle a is plotted towards the right and the sensor voltage U is plotted upwards. As is apparent from FIG. 5, the (rough) pedal position signal 52 is a linear function of the pedal angle a.

Figure 6:
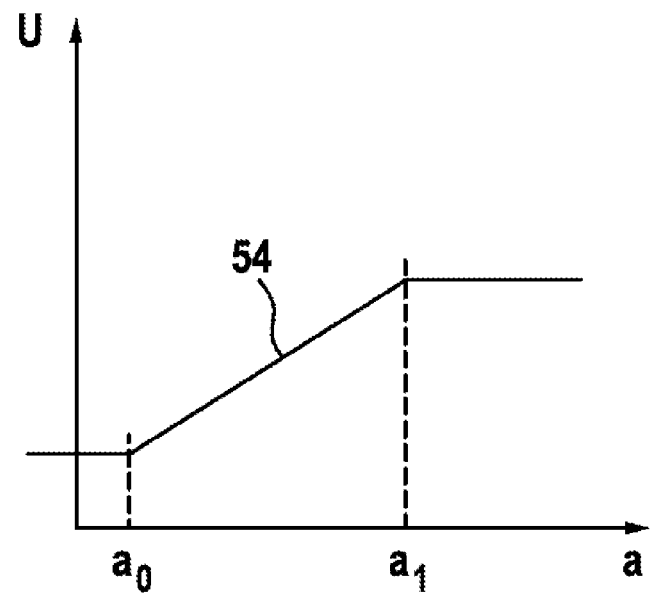
FIG. 6 shows a capped pedal position signal according to an embodiment of the disclosure.

FIG. 6 shows a capped pedal position signal 54 analogous to FIG. 5, which can be formed by the capping element 48. Between a minimum pedal angle $a_0$ and a maximum pedal angle $a_1$, the pedal position signal 54 is a linear function of the angle a. It has a minimum or a maximum constant value outside of said limits.

Again referring to FIG. 4, the central engine controller can comprise a differentiation element 50, with which a time derivative of the pedal position signal can be formed.

The detection of the pedal position signals in the central engine controller 18 can take place in the smallest time pattern of the central engine controller 18, for example every 1 ms. Because the transmission rate of the CAN bus 38 can be a multiple thereof, for example every 10 ms, the excess signal values in the 1 ms intermediate points in time can be used in order to filter the sensor signal and possibly to form time derivatives. The filtered signal is then capped for further processing in the central engine controller 18 and can be output to the CAN-bus 38 in capped and/or uncapped form and forwarded to the actuator controller in the active accelerator pedal 12. The time derivatives of the pedal position signal may also be transmitted to the actuator controller 28 by means of the CAN bus 38.

Additionally, it should be noted that "comprising" does not exclude any other elements or steps and "one" or "a" does not exclude any number. Furthermore, it should be noted that features or steps that have been described with reference to one of the above exemplary embodiments can also be used in combination with other features or steps of other exemplary embodiments described above. Reference characters in the claims are not to be viewed as limiting.

The invention claimed is:

1. An active accelerator pedal for a vehicle, the active accelerator pedal comprising:
    a pedal position sensor configured to detect a position of a pedal lever of the active accelerator pedal and to convert the position into a pedal position signal;
    an actuator configured to output haptic feedback to the pedal lever;
    an actuator controller configured to control the actuator, wherein the pedal position sensor is configured to transmit the pedal position signal to a central engine controller of the vehicle and to the actuator controller, the central engine controller being configured to control drive of the vehicle using the pedal position signal, and
    wherein the pedal position sensor includes two sensor elements which are each connected to the central engine controller and configured to output the pedal position signal to the central engine controller, and
    wherein one of the two sensor elements is connected to the actuator controller and provides the pedal position signal to the actuator controller.

2. The active accelerator pedal as claimed in claim 1, wherein the actuator controller is connected to the one of the two sensor elements of the pedal position sensor with a direct signal connection.

3. The active accelerator pedal as claimed in claim 1, wherein the actuator controller is connected with a signal connection to the one of the two sensor elements of the pedal position sensor and the pedal position sensor is configured to transmit pulse width modulated signals.

4. The active accelerator pedal as claimed in claim 1, wherein the actuator controller is connected to the one of the two sensor elements of the pedal position sensor with a Serial Peripheral Interface (SPI) connection.

5. A control system for an active accelerator pedal, the control system comprising:
    the active accelerator pedal including:
        a pedal position sensor configured to detect a position of a pedal lever of the active accelerator pedal and to convert the position into a pedal position signal;
        an actuator configured to output haptic feedback to the pedal lever;
        an actuator controller configured to control the actuator, wherein the pedal position sensor is configured to transmit the pedal position signal to a central engine controller of the vehicle and to the actuator controller; and
    the central engine controller,
    wherein the central engine controller is configured to receive the pedal position signal from the pedal position sensor and the central engine controller is further configured to control drive of the vehicle using the pedal position signal, and
    wherein the pedal position sensor includes two sensor elements which are each connected to the central engine controller and configured to output the pedal position signal to the central engine controller, and
    wherein one of the two sensor elements is connected to the actuator controller and provides the pedal position signal to the actuator controller.

6. The control system as claimed in claim 5, wherein the central engine controller is configured to process the pedal position signal and to transmit the signal to the actuator controller using a bus connection.

7. The control system as claimed in claim 5, wherein the central engine controller is configured to form a time derivative of the pedal position signal and to transmit the derivative to the actuator controller.

8. The control system as claimed in claim 5, wherein the central engine controller is configured to cap the pedal position signal.

9. The control system as claimed in claim 5, wherein the central engine controller is configured to combine a series of pedal position signals from the pedal position sensor to form a filtered pedal position signal and to transmit the filtered pedal position signal to the actuator controller.

10. A vehicle, comprising:
    an active accelerator pedal including:
        a pedal position sensor configured to detect a position of a pedal lever of the active accelerator pedal and to convert the position into a pedal position signal;
        an actuator configured to output haptic feedback to the pedal lever; and
        an actuator controller configured to control the actuator, wherein the pedal position sensor is configured to transmit the pedal position signal to a central engine controller of the vehicle and to the actuator controller, the central engine controller being configured to control drive of the vehicle using the pedal position signal, and
    wherein the pedal position sensor includes two sensor elements which are each connected to the central engine controller and configured to output the pedal position signal to the central engine controller, and wherein one of the two sensor elements is connected to the actuator controller and provides the pedal position signal to the actuator controller.

11. The vehicle as claimed in claim 10, further comprising:

a control system including the active accelerator pedal and the central engine controller, wherein the central engine controller is further configured to receive the pedal position signal from the pedal position sensor.

* * * * *